June 23, 1942.  H. A. BRASSERT  2,287,663
METAL PRODUCTION
Filed Dec. 7, 1940  2 Sheets-Sheet 1

INVENTOR
HERMAN A. BRASSERT
BY
ATTORNEYS

June 23, 1942.  H. A. BRASSERT  2,287,663
METAL PRODUCTION
Filed Dec. 7, 1940  2 Sheets-Sheet 2
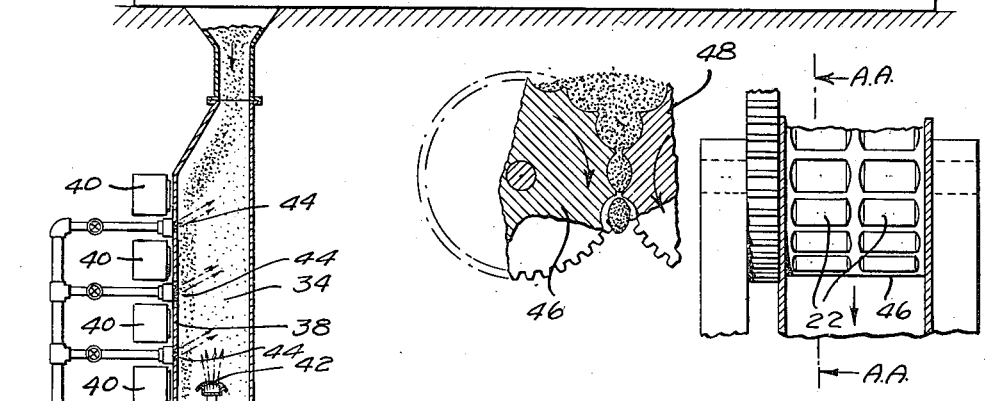
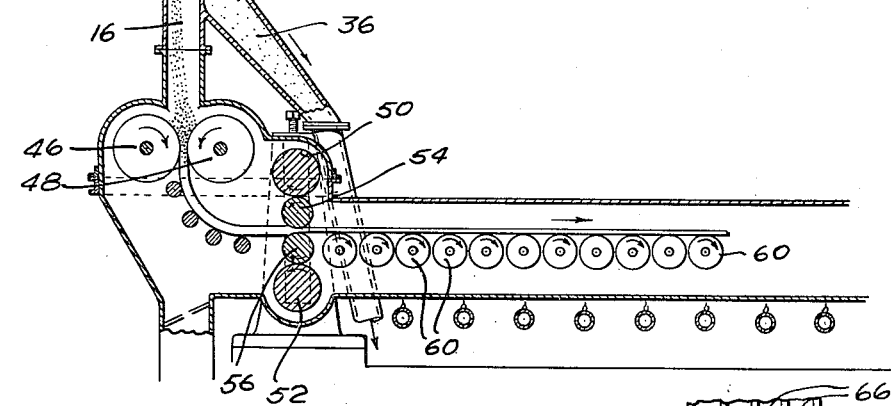
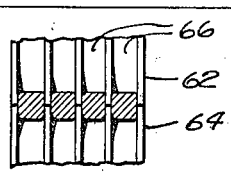
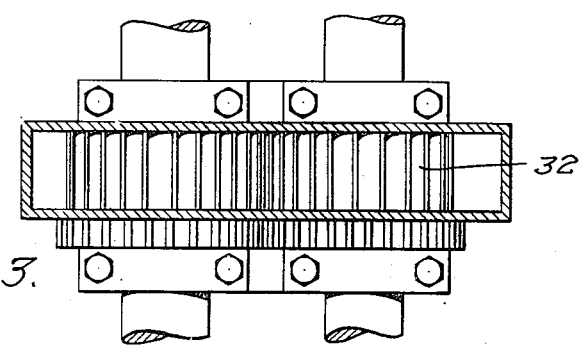
INVENTOR
HERMAN A. BRASSERT.
BY
ATTORNEYS Patented June 23, 1942

2,287,663

UNITED STATES PATENT OFFICE 2,287,663

METAL PRODUCTION

Herman A. Brassert, Rye, N. Y., assignor to Minerals and Metals Corporation, New York, N. Y., a corporation of Delaware Application December 7, 1940, Serial No. 369,053

18 Claims. (Cl. 75—22)

This invention relates to the production of a metal of substantially virgin purity by selective reduction of the metal from its finely divided ore and the transformation of the finely divided metallic product of the reducing operation, while still hot and substantially free of any surface contamination and, therefore, marked by a chemical activity at the surface greater than the ordinary, into a solid body or bodies.

When a metal, such, for example, as iron, is reduced by the usual method of reduction and smelting in a shaft furnace, the metal, by reason of the temperatures and conditions surrounding the reactions, is usually contaminated with undesirable elements which are reduced from the gangue contained in the ore along with the metal and which, in their reduced and molten stage, go into solution with the metal. An important object of the invention, therefore, is so to carry out the reduction and subsequent treatment of a metal as to prevent such contamination.

The invention relates particularly to the production of iron or steel of exceptional purity in the form of primary solid bodies, such as briquettes for remelting, or in the form of semi-finished products such as billets, slabs or sheet bars for rerolling or other working directly to finished shape without melting. The exceptional purity of the iron and steel, to which the invention is particularly directed, is its purity in respect to its content of one or several or all of the following elements; silicon, phosphorus, sulfur, nitrogen and, in the case of iron, also carbon. The invention also aims at the elimination or the neutralization of other impurities but especially those, such as the compounds of silicon, phosphorus, sulfur and nitrogen, which, when reduced and brought into solution with the molten metal, have the effect, upon solidification of the metal, of weakening the finished products by segregation and by collecting in the grain boundaries.

By the present invention, which is an improvement on the invention shown in my copending application, Serial No. 316,717, filed February 1, 1940, of which copending application the present application is a continuation in part, solid metallic bodies are produced which are immediately adaptable to the production of finished iron and steel products by steel plant equipment now in common use, whereas the reduced metallic powder which is the end product of all present direct reduction methods can only be used commercially in the field of powdered metallurgy.

The principal object of the present invention, therefore, is to produce, as an end product of a continuous process in which, as one step, a metallic powder is directly reduced from its finely divided ore, solid metallic bodies which are immediately adaptable to iron and steel production by the commonly used steel plant methods and equipment.

The invention further aims to provide improved methods and means for so dealing with the hot metallic powder throughout a continuous process, which involves both the reduction of the metallic powder from its finely divided ore and the transformation or consolidation of the reduced powder into self-sustaining masses or bodies, as to avoid the difficulties caused by fritting and sticking which, by their prevention of large tonnage production, have heretofore prevented the adoption of reduced iron ore powder in the steel industry as a major basic material.

An important object of the invention is to take advantage of the characteristics of a directly reduced metallic powder immediately after reduction in order to facilitate the conversion of a continuous stream of the reduced metallic powder grains to self-sustaining masses of infinitely greater dimensions than the individual grains, while the reduced metallic powder grains are still hot and substantially free of any surface contamination and, therefore, marked by a chemical activity at the surface greater than the ordinary, in which state their surfaces are most easily welded together. Another object of the invention is to consolidate the reduced metallic powder grains, while in the aforementioned state, into self-sustaining masses of predetermined size and density to suit the particular deforming operations subsequently to be employed in producing the finished products.

Still another object of the invention is to bring the small particles of virgin metal together into self-sustaining masses at the time when, individually, they would be most vulnerable to oxidation and other detrimental influences.

With the foregoing and other objects in view, the invention aims so to control the temperatures in the reducing step as to insure that condition which is most favorable to reduction without premature agglomeration of the reduced metallic powder before its discharge from the reducing furnace. The invention further aims so to control the temperature of the metallic powder after reduction that the temperature prior to the primary consolidation step is within the limits of magnetic permeability.

The end product of the existing commercial direct reduction methods is made up of sponge-like particles and is commonly called "sponge iron." The present invention aims, among other things, to produce solid iron and steel bodies from the metallic powder immediately resulting from a direct reduction operation without the production of the spongy mass which is the end product of existing processes.

The invention also aims to produce, as the end product of a continuous process, solid iron or steel masses or bodies from finely divided iron or other ores without ever reaching temperatures at which reduction of compounds of detrimental elements would take place.

A further object of the invention is to produce substantially pure iron by reducing highly concentrated iron ores by means of reducing agents in the gaseous phase, without the use of solid carbon, and then reconcentrating the reduced metallic powder, while still hot, by magnetic or other means for effecting such concentration, or by a combination of separating means.

Another object of the invention is to reduce iron ore and to consolidate the reduced powder into shaped bodies by passing it through rolls at substantially the temperature at which it leaves the reduction step, without an intermediate reheating step.

Another object of the invention is to increase the density of a mass of reduced iron grains while substantially free of any surface contamination and, therefore, marked by a chemical activity at the surface greater than the ordinary and at temperatures which are relatively low, for example, only slightly above the equicohesive temperature of the iron or steel grains, and also at relatively low pressures, in a continuous and coordinated series of operations for the production of iron and steel products.

Another object of the invention is to reduce finely divided iron ore and then consolidate the particles, while hot, into a self-sustaining mass and subsequently to melt the mass for the production of commercial iron or steel products. The invention also contemplates the production of iron and steel products by reheating the self-sustaining mass just described and rolling or extruding it.

The present invention aims also to produce alloys of predetermined chemical and/or physical characteristics by directly reducing iron oxide particles, as hereinabove set forth, admixing finely divided alloying elements with the powdered ore charge, before and/or after its reduction but prior to consolidation, forming solid bodies by consolidating the mixed powders immediately after reduction and then reheating these bodies under controlled conditions which will bring about the complete homogeneous alloying of the additions with the iron.

Other objects and important features of the invention will appear from the following description and claims when considered in connection with the accompanying drawings, in which Figure 1 is a vertical section through a reducing furnace and a connected briquetting machine adapted to carry out the novel process of the present invention, particularly in the formation of primary solid bodies of iron and steel;

Figure 2 is a partial elevation of a briquetting roll;

Figure 2A is a fragmentary section on the line A—A of Figure 2;

Figure 3 illustrates a modified form of briquetting rolls for long briquettes;

Figure 4 shows a modification of apparatus for practicing the novel process of the present invention, particularly when the process includes a second concentration step, the end product of this apparatus being a sheet;

Figure 5 shows modified rolls which may be used in the apparatus shown in Figure 4 when it is desired to make billet bars.

Figure 1:
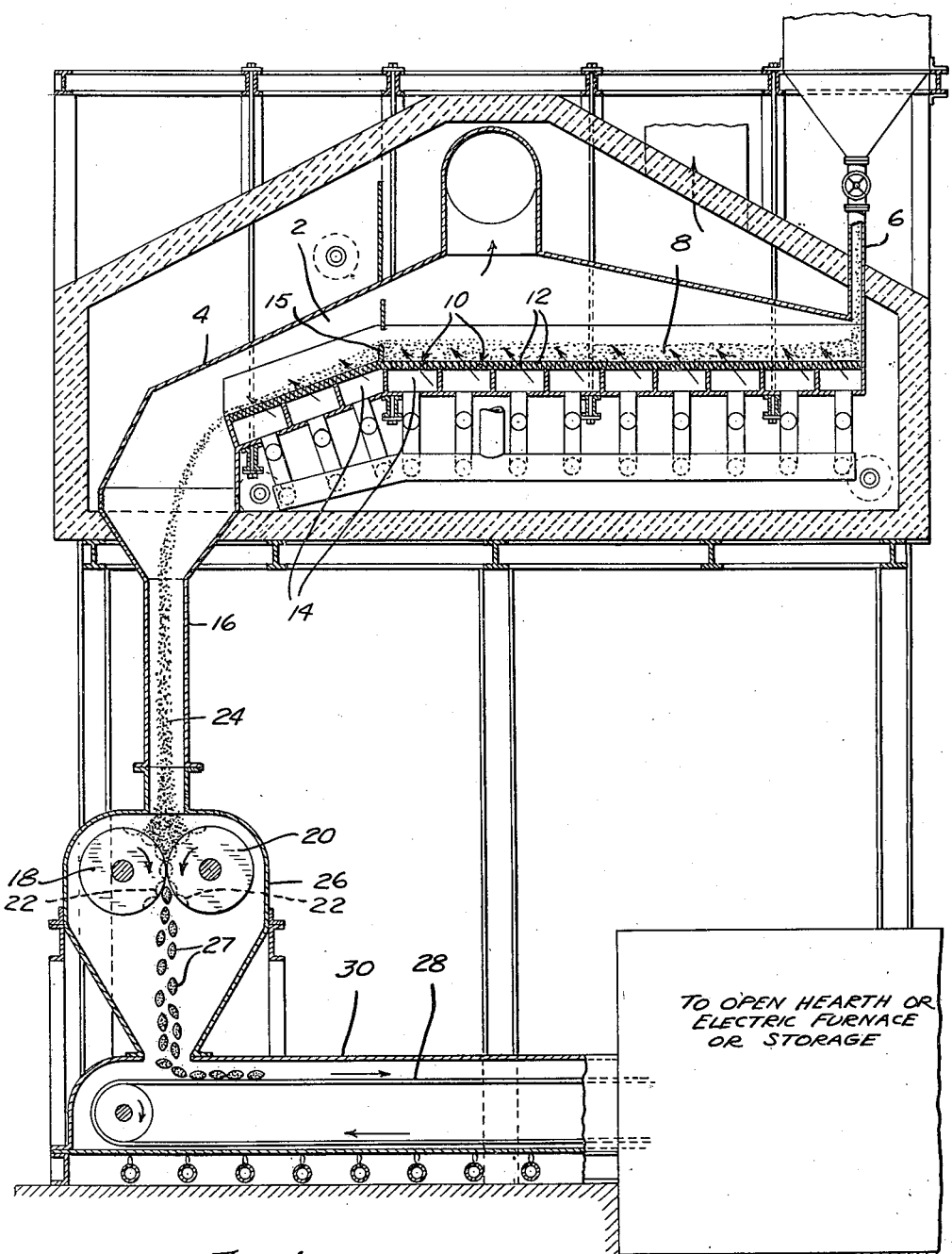

The invention will be particularly described in its application to the production of primary and semi-finished forms of iron and steel.

In the common method of producing iron and steel, the iron ores are reduced and brought to the molten state in the blast furnace, the gangue being separated from the metal in the form of liquid slag. In the blast furnace, reduction of the iron takes place through indirect reduction by the gases in the upper part of the furnace and through direct reduction by solid carbon in the bosh and hearth of the furnace where the impurities contained in the gangue, in the form of various compounds which are reducible to their elements under blast furnace conditions, are reduced and go into solution with the iron. In addition to the impurities found in the gangue, the sulfur usually present in the coke is also partly absorbed by the molten iron and upon solidification forms the iron—iron sulfide eutectic. The purpose of the various steel processes is to remove these impurities as completely as possible and chiefly to remove the carbon, silicon, phosphorus and sulfur or at least to reduce them to the percentages specified by the consumer. The complete removal of these impurities is not practicable in commercial steel making by the present processes.

The present invention aims to avoid the absorption in the iron of the aforementioned impurities, and particularly the carbon, silicon, phosphorus and sulfur, by effecting as complete a removal of the gangue from the finely divided ore as is possible by known methods of beneficiation, separation and concentration and then reducing the finely divided ore to the metallic powder state under controlled temperatures to prevent sintering and melting. In accordance with the present invention, this is accomplished by mixing the finely divided ore intimately with suitable hot reducing gases, with or without the admixture therewith of solid reducing agents, and causing the ore to travel continuously through a furnace in which a continuous reduction to metallic powder takes place, the temperatures being so controlled that the powder is reduced and discharged in the reduced state at temperatures below the agglomerating temperature of the particles.

In order to accelerate the reduction and to prevent uncontrolled carbon deposition if CO be present in the reducing gases, it is desirable to cause violent local action between the particles of the ore and the gases and, therefore, in the preferred practice of the present invention, the gases preferably pass through the ore in a transverse direction rather than in a countercurrent flow thereover. Operation in this manner prevents the spent reaction gases from coming into contact with the ore and thus prevents reversion of the reducing reaction. A furnace in which direct reduction of finely divided iron ore can be carried out in the manner above set forth is illustrated in the copending application of James C. Hartley, Serial No. 338,560, filed June 3, 1940, and also in the co-pending application of Herman A. Brassert and James C. Hartley, Serial No. 360,418, filed October 9, 1940.

I have discovered that when iron ore in finely divided condition is directly reduced, as for example in the manner above set forth, the reduced powder particles, being, after reduction, substantially free of any surface contamination and, therefore, marked by a chemical activity at the surface greater than the ordinary, are particularly eager to agglomerate and that therefore their consolidation into self-sustaining masses or solid bodies can be accomplished at lower temperatures and lower pressures if performed immediately following reduction and with as little loss of temperature as possible and with no opportunity presented for surface oxidation in the reduced powder. I have also discovered that with the common magnetite and hematite ores it is not necessary to reheat the reduced iron powder to temperatures higher than that of the temperature of the powder at the end of the reduction operation in order to produce solid metallic bodies of sufficient strength to be handled by the usual equipment employed in steel mills, especially if the iron powder be immediately and continuously consolidated while hot. Furthermore, I have discovered that it is not even necessary to have the reduced iron powder at as high a temperature as it has at the end of the reduction operation to effect the desired consolidation thereof into metallic bodies of sufficient strength to be handled by the usual equipment employed in steel mills, if this consolidation be effected while the powder is still substantially free of any surface contamination and, therefore, marked by a chemical activity at the surface greater than the ordinary and still retains heat of the reducing operation, but that such consolidation can be satisfactorily effected, without additional heating, even after the temperature of the reduced iron powder has been brought within the upper limits of the magnetic permeability of iron, thus permitting a further concentration of the iron powder and a further removal of any residual gangue before the consolidation takes place.

If metallic ores be used in practicing the process of this invention which produce, as the product of the reduction operation, a metallic powder that cannot be satisfactorily consolidated at the temperature at which the powder leaves the reduction stage, additional heat may be applied to the powder before passing it through the rolls or other forming means. Furthermore, if magnetic separation is to be employed to insure a purer metallic powder between the reducing and forming operations, then it may be necessary, with the metallic powders reduced from some ores, to lower the temperature of the metallic powder after it leaves the reduction stage to bring it within the range of magnetic permeability and then again to increase it before the forming operation.

I have further discovered that if reduced iron powder, for example, be not transformed into self-sustaining masses immediately after reduction but be allowed to cool so far that it has to be reheated, the welding of the powder into a solid body becomes more difficult due to chemical or physical changes in the surfaces of the grains during the cooling and the heating, this surface contamination probably being caused either by oxidation or by the effect of gases other than oxygen. The present invention provides, therefore, for discharging the reduced ore, preferably continuously and either directly or after a further separating operation, into suitable compacting or consolidating means, such as rolls, to form briquettes, billets, bars, sheet bars or other suitable forms, or into presses, or into means for consolidating by jarring or vibrating, or into extrusion means, in order to effect the immediate consolidation of the reduced powder, while the particles are still substantially free of any surface contamination and, therefore, of higher than ordinary chemical activity at the surface and while they are still hot, into self-sustaining masses or solid bodies and successively delivering the solid bodies thus produced in a continuous operation. In all cases the consolidation of the metallic powder is carried out while retaining as much as possible of the sensible heat of the reduced material and also preferably in a reducing atmosphere.

I have discovered that at temperatures around 1650° F. the directly reduced powder from the commonly used iron ores does not stick to rolls and that at temperatures corresponding to the upper range of magnetic permeability of iron shaped bodies may be formed by passing the hot reduced powder, immediately after reduction, through rolls or other means for forming and consolidating the powder into self-sustaining masses, such, for example, as means for extruding the hot powder into slugs. I have further discovered that, when the hot reduced powder is thus consolidated substantially immediately after reduction, the pressure exerted by the rolls needs to be only nominal, for instance, in the neighborhood of 2½ tons to the square inch, in order to convert the hot powder into melting stock or into semi-finished forms which can be handled by the usual steel works methods and equipment. Briquettes or other shapes produced in this manner are suitable for charging into an open hearth or electric furnace to be melted, whereas it has been found in practice that the addition of directly reduced iron ore in powdered form to the molten bath in an open hearth or electric furnace is entirely unsatisfactory for very obvious reasons. Billets, bars, sheet bars and other forms produced in this manner can be conveyed into the usual heating furnaces to bring their temperature up to that required for rolling in finishing mills thereby permitting the manufacture of any desired finished products without melting.

If the material produced in the manner hereinabove set forth be intended for melting and especially if it be intended for melting in the open hearth furnace, it may be advantageous not to carry the reduction of the iron oxides to completion before the consolidating step, but to leave a small percentage of the iron in the form of oxides to facilitate melting and to prevent reduction of the compounds of the undesirable elements hereinabove referred to. It may also be advantageous and economical not to carry concentration of the ores too far, but to leave some impurities in the ore and reduced powder to lower the melting temperature of the briquettes. Furthermore, carbon in measured controllable quantities and uniformly dispersed throughout the charge may be added to the finely divided iron ore before feeding it into the reduction furnace or it may be added to the reduced powder before the consolidating operation in order to lower the melting point of the briquettes or slugs. Or sufficient carbon may be added to the melting charge in the open hearth furnace both to facilitate melting and at the same time to reduce any iron oxide left unreduced in the briquettes. These and other means and practices may be used singly or together in order to establish the most economical melting practice, which will vary in accordance with the characteristics of the ores used. Moreover, in order to prevent reoxidation of the briquettes and to preserve heat, the melting process may be carried on by conveying the hot briquettes immediately from the reduction furnace into the open hearth furnace in which a residual portion of liquid metal from the previous heat may be left to accelerate the melting of the briquettes.

If very pure metal be desired, purification of the original ore to free it from the major portion of its gangue must be carried to a higher degree and the open hearth or electric furnace charge must be melted under conditions which do not permit reduction of impurities contained in the small amounts of gangue still remaining in the reduced ore. In order to remove these impurities, I propose to subject the reduced ore powder as it is discharged from the reducing furnace to a final purification by means of magnetic, gravity or other separation methods, preceded if necessary by finer grinding of the reduced powder, or by a combination of such methods, preferably at or near the temperature at which the ore is discharged from the reduction furnace. For example, the falling stream of reduced ore powder may be subjected to the pull of a magnetic field acting transversely thereto while a current of reducing gas is blowing upward through the falling stream to retard its fall and another current of gas blows transversely across the stream of descending ore to aid in the separation of the impurities. Where hematites or other ores are used, which are non-magnetic in their natural state, but which become magnetic in their reduced state, this secondary concentration may be the only one required, especially if melting stock is being produced.

From highly concentrated ores, substantially free from gangue, very pure steel can be made by the acid melting process which, as is known, gives a particularly desirable quality of steel for special uses. If the basic melting process be used the basic flux added will absorb in the slag such small amounts of the gangue as may still remain in the reduced ore. The basic electric furnace is particularly adapted to the production of very high grade steel under these conditions and, if pure metal is to be made, the electric induction furnace has the advantage of total absence of carbon. If metal practically free from carbon is desired, the oxides remaining in the charge can be eliminated by hot highly basic slag. By these means and practices nearly pure iron or steel can be made with only traces of carbon, phosphorus and sulfur in solution with the iron grains.

If finished steel products are to be made by the present invention, carbon may be added to the raw finely divided ore and additional carbon may be added to the hot reduced powder before the primary consolidation. In the same manner, iron and steel alloys may be produced, either by adding powdered oxides of the alloying metals to the iron ore before reduction or by adding the alloying metals in powdered form to the reduced iron powder, as hereinabove suggested, all before the primary consolidation step. As an example, nickel and/or chromium can be added just before the primary consolidation step in the form of a powder or powders and thus become consolidated with the iron.

Referring now to the drawings for a more detailed description of practical ways of practicing the process of the present invention, the concentrated ore to be reduced is introduced into the reduction chamber 2 of a reducing furnace 4 through a feeding chute or chutes 6, the illustrated furnace being of the type disclosed in the co-pending application of James C. Hartley, Serial No. 338,560, and also in the co-pending application of Herman A. Brassert and James C. Hartley, Serial No. 360,418, hereinabove more fully identified. In the reducing furnaces shown in the co-pending applications above referred to, the finely divided raw or preferably highly concentrated ore 8 to be reduced is delivered or charged upon one end of a hearth 10 provided with jet orifices 12, preferably inclined in the direction of feed of the ore 8 across the hearth 10.

The reducing gas or mixture of gases is caused to flow upward through the jet orifices 12 and through the ore supported upon the hearth 10 with sufficient force to thoroughly permeate and render fluent the mass of ore upon the hearth, the gases, as more fully set forth in said co-pending applications, being preheated at least to the temperature at which the reduction, if endothermic, is to take place and being conducted to the under side of the orifices 12 by manifolds or conduits 14 located on the under side of the hearth 10. A dam or weir 15 at the discharge end of the hearth 12 maintains a predetermined minimum depth of ore upon the hearth 10 to insure the desired interaction between the reducing gases and the ore before the reduced powder is discharged over the upper edge of the dam or weir 15 into the discharge chute 16.

In the form of the apparatus designed to practice the novel process of the present invention, which is illustrated in Figure 1, the metallic powder or powdered iron, if the ore 8 be an iron ore, is led directly from the reduction chamber 2 through the discharge chute 16 to apparatus for consolidating the metallic powder into a self-sustaining mass or self-sustaining masses. The consolidating apparatus shown in Figure 1 comprises briquetting rolls 18 and 20, each having formed in its cylindrical face half molds 22 which are so positioned on the roll as to register with correspondingly positioned half molds 22 in the cylindrical face of the other roll when these faces are brought together in the rotation of the rolls, the rolls 18 and 20 being geared to rotate in definite timed relations to each other. The discharge chute 16 is so arranged that the reduced ore powder or iron powder 24 is discharged into the bite of the rolls 18 and 20 where it accumulates sufficiently to fill the half molds 22 as they approach each other, thus permitting the two half molds, as the cylinders come into tangential relation to each other in their rotation, to exert a considerable compacting or consolidating pressure upon the iron powder, with the result that this iron powder, still hot from the reducing operation and with its particles still substantially free of any surface contamination and, therefore, of higher than ordinary chemical activity at the surface, is compressed into a briquette having considerable density, solidity and strength.

The rolls 18 and 20 are enclosed within a housing 26 of such construction that a non-oxidizing atmosphere may be maintained therein while the consolidation of the reduced iron powder is taking place, thus preventing the iron powder from becoming oxidized before it is consolidated into briquettes.

The briquettes 27 after formation may be handled in any suitable manner depending upon whether or not they are to be used at once in iron or steel fabrication. If the briquettes are to be transferred to a melting furnace such as an open hearth furnace or an electrical furnace, it is preferable to retain as much of their sensible heat content as possible. As herein shown, they may be dropped from the briquetting rolls upon an endless conveyor 28 by means of which they may be transferred to the melting furnace or other place of immediate use. The endless conveyor 28 is likewise preferably enclosed within a housing 30 of such construction that a non-oxidizing atmosphere may be maintained therein and it preferably also passes over a hot bed to insure maintenance of the heat of the briquettes and also to cause additional heat to be imparted to the briquettes before discharge into the melting furnace.

In Figure 3 is shown a modification of the briquetting rolls. In the form of roll shown in Figure 3, the half molds 32 are of such shape as to produce a briquette having a considerably greater length than the one produced by the rolls 22.

In the modified form of apparatus illustrated in Figure 4 of the drawings, provision is made for a further purification step, involving the separation of the powdered iron from any residual gangue after the reducing operation and before the compression of the iron powder into a self-sustaining mass or masses. In the modified apparatus illustrated in Figure 4, provision is made for effecting a magnetic separation of the iron powder from any residual gangue and also for first reducing the temperature of the powder, as it is discharged from the reducing furnace, to bring it within the upper limits of the magnetic permeability of iron, that is, somewhat below a temperature of around 1370° F.

Under ordinary conditions of operation of the furnace herein illustrated, the temperature of the reduced iron powder as it is discharged from the hearth 10 of the reducing furnace will be around 1650° F. In order to reduce the temperature of this powder to bring the temperature of the iron content thereof below 1370° F. so that magnetic concentration of the iron content of the powder or magnetic separation of the iron from any remaining gangue may take place, while at the same time protecting the powder from oxidation, provision has been made for effecting this cooling by means of reducing gases and in such manner that the reducing gases will aid in the separation. As herein illustrated, there has been interposed between the discharge chute 16 of the form of apparatus shown in Figure 1 and the discharge end of the furnace, a separating chamber 34 having at one side of its bottom end a connection with the discharge chute 16 for conducting the powdered iron into the compressing mechanism and having at the other side of its bottom end a discharge conduit 36 to receive the separated gangue.

Arranged along the left hand wall 38 of the chamber 34 are magnets 40 for setting up a magnetic field tending to pull the iron content of the reduced powder toward the left hand wall of the chamber 34 as it falls therethrough, thus causing it to be discharged into the chute 16. In order both to cool the iron powder to bring its temperature within the upper range of magnetic permeability and at the same time to retard its fall sufficiently to permit time for the separating action to take place, a stream of reducing gas is caused to flow upward through the chamber 34, being introduced through perforations 42 in the bottom of the chamber which so direct the upwardly flowing streams of reducing gas that they cover the entire cross section of the chamber 34, thereby preventing any tendency to channelling flow of the reducing gas through the down flowing stream of powder. It will be obvious that in order to effect the desired cooling of the iron powder within practical space limits the temperature of the reducing gas as it enters the chamber 34 will need to be considerably below 1370° F.

To assist in the cooling action and also in the separation of any remaining gangue from the powdered iron, reducing gas is also introduced into the chamber 34 through the side wall 38 in a direction transverse to the flow of the powder downwardly. Instead of directing the reducing gas entering the chamber 34 through the perforations 44 in the side wall 38 at right angles to the downward flowing stream of powder, the jets of reducing gas entering through the perforations 44 will preferably be directed obliquely upward so as to assist somewhat in retarding the downward flow of the stream of powder.

It will be apparent that the jets of reducing gas entering the chamber 34 through the perforations 44 will perform two functions: First, they will assist in both cooling and retarding the flow of powdered iron as it passes downwardly through the chamber 34 and, secondly, they will tend to blow the gangue constituents of the powder toward the right hand side of the chamber 34 and thus direct this gangue into the discharge conduit 36 while the iron is being pulled toward the left hand wall by the magnets 40.

In the modified form of apparatus shown in Figure 4, the reduced iron powder, after being further concentrated in the manner just described, is conducted by the chute 16 into the bit of the sheet forming rolls 46 and 48 where, instead of being formed into briquettes, as in the apparatus in Figure 1, it is compressed into a continuous sheet. The rolls 46 and 48 effect the initial compression, which will be sufficient to compress the powder into a self-sustaining sheet, and a further compression will be effected in a 4-high roll arrangement such as shown somewhat diagrammatically in Figure 4. The 4-high roll arrangement comprises the usual two backing rolls 50 and 52 and the sheet-engaging rolls 54 and 56, the rolls 50 and 52 being maintained in engagement with the sheet-engaging rolls in any suitable manner, as, for example, by springs or adjusting screws.

As in the form of apparatus shown in Figure 1, the compression of the iron powder into a self-sustaining mass will take place in a reducing atmosphere, preferably both the initial compressing rolls 46 and 48 and the 4-high rolls being enclosed in a casing 58 in which a non-oxidizing atmosphere may be provided. The sheet, after it leaves the 4-high rolls, will be delivered to a roller conveyor 60 on which it can be conducted to the place of use or storage, as the case may be.

In Figure 5 is shown a modification of the rolls 46 and 48 for making billet bars, the modified rolls 62 and 64 being provided with cooperating circumferential grooves 66.

From the foregoing it will be seen that primary iron or steel solids of sufficient structural strength for subsequent handling by ordinary iron or steel mill equipment and/or of sufficient density and specific gravity to sink through the slag covering of the bath in a melting furnace can be formed from directly reduced iron powder without raising the reduced powder to a temperature above that at which it leaves the reducing furnace, if the consolidation be carried out in the novel manner hereinabove set forth. It will further be seen that consolidation to the above indicated extent may also be carried out without the application of additional heat even after provision has been made for an intermediate magnetic separation.

It will be understood, of course, that the invention is not limited to the particular forms of compressing or consolidating means herein illustrated and described but that the primary consolidation may be effected in any suitable or well-known manner, as, for example, by extrusion, as illustrated in my co-pending application Serial No. 323,076, filed March 9, 1940, but preferably without the intermediate heating step there shown.

As hereinabove suggested, the primary consolidation made possible by the novel process of the present invention results in the production of a primary solid which can be handled by the usual steel works equipment. By "usual steel works equipment" is meant the rolling, pressing, forging, drawing and extruding machines such as are found in plants employed in the conversion of ingots, billets, slabs or sheet bars into finished products by rolling, pressing, forging, drawing or extruding, such plants also including suitable furnaces for raising the ingots, billets, slabs or sheet bars to the proper temperatures for the succeeding operations thereon.

What is claimed as new is:

1. The process of producing primary solids of substantially virgin metal, which consists in directly reducing finely divided concentrated ore at temperatures below both the melting and the sintering temperatures of the metal constituent thereof to be recovered and forthwith compressing the metallic powder thus produced into a self-sustaining mass while said powder is still hot from the reducing operation, is still substantially free of any surface contamination and, therefore, of higher than ordinary chemical activity at the surface and is in a protective atmosphere, all as a continuous process carried out at temperatures below both the welding and the fusion temperatures of the metal.

2. The process of producing primary solids of substantially virgin metal, which consists in directly reducing finely divided ore at temperatures below the melting temperature of the metal constituent thereof to be recovered and forthwith compressing the metallic powder thus produced into a self-sustaining mass while said powder is still hot from the reducing operation and in a protective atmosphere, a further separation of the metal from any residual gangue in the reduced powder being effected between the reducing and compressing steps and in a non-oxidizing atmosphere, as part of a continuous process.

3. The process of producing, in a substantially virgin state, primary solids of a metal of the group of metals which are magnetically permeable, which consists in directly reducing finely divided ore at temperatures below the melting temperature of the metal constituent thereof to be recovered, lowering the temperature of the metallic powder thus produced until it is within the upper range of magnetic permeability of the metal, effecting a magnetic concentration thereof to separate the metal from any residual gangue and, while said metallic powder is still heated to the aforementioned separating temperature, compressing it into a self-sustaining mass, all as a continuous process in protective atmospheres.

4. The process of producing primary solids of iron or steel, substantially free from undesirable silicon, phosphorus and sulfur, which consists in directly reducing finely divided iron ore at temperatures below both the melting and the sintering temperature of the iron and of any residual gangue and, while the reduced iron powder is still substantially free of surface contamination and, therefore, of higher than ordinary chemical activity at the surface, is in a protective atmosphere and is still hot from the reducing operation, compressing it into a self-sustaining mass, all as a continuous process carried out at temperatures below both the welding and the fusion temperatures of the metal.

5. The process of producing iron substantially free from carbon, silicon, phosphorus and sulfur, which consists in directly reducing finely divided iron ore at temperatures below both the melting and the sintering temperature of the iron and of any residual gangue, lowering the temperature of the reduced iron powder to the upper range of magnetic permeability of the iron, effecting a magnetic separation of the iron powder from the residual gangue and, while the powder is still heated to said separating temperature and is still substantially free of surface contamination and, therefore, of higher than ordinary chemical activity at the surface, compressing the iron into a self-sustaining mass, all as a continuous process in protective atmospheres.

6. The process of producing iron or steel melting stock for open hearth furnace work which consists in directly reducing finely divided iron ore at temperatures below both the melting and the sintering temperatures of any of the constituents thereof and forthwith compressing the powdered iron thus produced into a self-sustaining mass while said iron is still hot from the reducing operation, is still substantially free of any surface contamination and, therefore, of higher than ordinary chemical activity at the surface and is in a protective atmosphere, all as a continuous process carried out at temperatures below both the welding and the fusion temperatures of the metal and at pressures comparatively low but sufficient to produce a dense self-sustaining mass of a specific gravity greater than that of the molten slag of the open hearth furnace in which it is to be melted.

7. A process according to claim 6 in which, between the reducing and compressing steps, a material is added to the reduced metallic powder which will lower the melting point of the compressed self-sustaining mass.

8. A process according to claim 6 in which sufficient carbon is added to the metallic powder between the reducing and compressing steps to lower the melting point of the compressed self-sustaining mass.

9. A process according to claim 6 in which powdered solid carbon is added to the finely divided ore before reduction and also to the finely divided metallic powder after reduction.

10. A process according to claim 1 in which, between the reducing and compressing steps, a powdered alloying element is added to the reduced metallic powder and is compressed therewith into the self-sustaining mass.

11. A process according to claim 1 in which, as part of a continuous process, the primary self-sustaining mass is raised to the working temperature requisite for deforming into a semi-finished or finished product and is then deformed.

12. A process according to claim 4 in which a further separation of the metallic powder from any residual gangue is effected between the reducing and compressing steps until the primary solid product of the process contains only a trace of sulfur.

13. A process according to claim 4 in which a further separation of the metallic powder from any residual gangue is effected between the reducing and compressing steps until the primary solid product of the process contains only a trace of phosphorus.

14. A process according to claim 4 in which, between the reducing and compressing steps, a further separation of the metallic powder from any residual gangue is effected until the sulfur content is less than .015%, the requisite carbon for the desired steel specification is added before the compressing step and the self-sustaining mass is then heated to the required deforming temperature and deformed into a semi-finished or finished steel product, without an intermediate melting step and having the said sulfur and the specified carbon content.

15. A process according to claim 1 in which the compression, although comparatively low is sufficient to produce a solid of a density and strength such that it may be handled by the usual steel works equipment.

16. A process according to claim 1 in which the metallic powder is compressed into primary individual solids of briquette form.

17. The process of producing iron as a basic material for the manufacture of steel and iron products and substantially free from undesirable carbon, silicon, sulfur and phosphorus, which consists in concentrating, in finely divided condition, the ore to be reduced until the greater portion of its gangue is removed, effecting a direct reduction thereof by means of reducing agents in the gaseous phase and at temperatures below the fusion temperature of the iron or of any residual gangue, bringing the temperature of the reduced iron powder within the upper range of magnetic permeability of iron, magnetically effecting a further concentration of the reduced ore and, while the reduced ore is still substantially free of any surface contamination and, therefore, of higher than ordinary chemical activity at the surface and at substantially the separation temperature, effecting a consolidation thereof into self-sustaining masses capable of being handled by the usual steel works equipment, all as a continuous process in protective atmospheres.

18. A process according to claim 1 in which the finely divided concentrated ore is an iron ore.

HERMAN A. BRASSERT.